(12) United States Patent
Gibbs et al.

(10) Patent No.: US 6,292,187 B1
(45) Date of Patent: Sep. 18, 2001

(54) METHOD AND SYSTEM FOR MODIFYING THE VISUAL PRESENTATION AND RESPONSE TO USER ACTION OF A BROADCAST APPLICATION'S USER INTERFACE

(75) Inventors: Simon J. Gibbs, San Jose, CA (US); Neil Matthews, Tadley (GB)

(73) Assignees: Sony Electronics, Inc., Park Ridge, NJ (US); Sony Corporation of Japan, Tokyo (JP)

( * ) Notice: Subject to any disclaimer, the term of this patent is extended or adjusted under 35 U.S.C. 154(b) by 0 days.

(21) Appl. No.: 09/406,149

(22) Filed: Sep. 27, 1999

(51) Int. Cl.[7] ........................................ G06F 3/00
(52) U.S. Cl. ..................... 345/346; 348/906; 725/37; 345/356
(58) Field of Search ................................. 345/327, 328, 345/333, 335, 346, 356; 348/578, 579, 595, 598, 599, 906; 725/37, 43, 51

(56) References Cited

U.S. PATENT DOCUMENTS

| | | | |
|---|---|---|---|
| 5,666,293 | 9/1997 | Metz et al. | 725/132 |
| 5,734,589 | 3/1998 | Kostreski et al. | 345/327 |
| 5,929,850 | * 7/1999 | Broadwin et al. | 345/327 |
| 5,987,509 | 11/1999 | Portuesi | 725/113 |
| 6,005,561 | * 12/1999 | Hawkins et al. | 348/6 |
| 6,038,545 | * 5/2000 | Mandeberg et al. | 705/15 |
| 6,097,389 | * 8/2000 | Morris et al. | 345/348 |

\* cited by examiner

Primary Examiner—Raymond J. Bayerl
Assistant Examiner—Cao H. Nguyen
(74) Attorney, Agent, or Firm—Wagner, Murabito & Hao LLP

(57) ABSTRACT

A method and system for modifying the look and feel of a user interface of a broadcast application program without altering the broadcast application program. In one embodiment, user interfaces are represented as a hierarchical scene including a background and several components. Within an electronic network, broadcast applications can become resident, e.g., land, on a vendor's device within the network where the device has the ability to display a user interface. The present invention provides a set of mattes that can be used to modify the visual presentation of the user interface of a broadcast application without altering the broadcast application. In this way, the vendor of the device can have some level of control regarding the way in which user interfaces are displayed on the device. Each matte controls the way in which an associated component of the user interface is displayed and how the component is combined with other components. In one embodiment, mattes can force components to become semi-transparent thereby creating certain fading effects, special effects with respect to windows in focus, special effects on windows becoming iconified, wiping effects, etc., with respect to the components of the user interface. The present invention can be implemented as a set of application programming interfaces (APIs) which can be used by an application manager of the vendor's device, e.g., a digital television receiver. The APIs would be available to broadcast applications and could be used for visual effects involving elements of an application's user interface.

20 Claims, 16 Drawing Sheets

METHOD AND SYSTEM FOR MODIFYING THE VISUAL PRESENTATION AND RESPONSE TO USER ACTION OF A BROADCAST APPLICATION'S USER INTERFACE

BACKGROUND OF THE INVENTION

1. Field of the Invention

The present invention relates to the field of computer implemented graphic image display. More particularly, the present invention relates to the field of computer implemented graphical user interfaces.

2. Related Art

FIG. 1 illustrates an exemplary electronic system 10 including a digital television receiver 12 coupled to a source of digital information such as the Internet or a digital broadcast medium 20. Under control from a software application program that is resident therein, the digital television receiver 12 is able to display a user interface (UI) 14 on a display screen. The user interface 14 contains graphical elements such as menu bars 20, buttons 16 and entry fields 18. The software environments being standardized for digital television receivers allow software application programs that are downloaded over broadcast transmissions ("broadcast applications") to construct graphical user interfaces 14 that are rendered by the digital television receiver 12. In general, the broadcast applications are foreign to the digital television receiver 12 and, as such, can be authored by vendors other than the vendor of the digital television receiver 12. Broadcast applications typically want to install and use their own user interfaces and have a rich programming environment at their disposal which provides them with much freedom in defining the look and feel of their user interfaces.

One problem in the prior art is that receiver vendors (manufacturers) also want some ability to influence the look and feel (e.g., the visual presentation and reaction to user events) of downloaded applications in order to provide a consistent and predictable experience for the user thereby making it easier for the user to interact with the receiver. In the above environment, the user interface of a broadcast application can conflict with the user interface appearance of the device vendor. In traditional windowing environments, the broadcast application's look and feel is determined largely by predefined user interface components, e.g., buttons, menus, window boarders, fields, etc., which are assembled and tailored by applications. The computer system platform of the receiver influences the look and feel first by specifying the APIs (Application Programming Interfaces) used to construct UI components and second by specifying the parameters, e.g., window border color, by which applications (or the user) may customize the appearance and behavior of UI components.

However, this approach is not viable in the proposed environments 10 (FIG. 1) for digital television receivers because broadcast applications may choose to ignore pre-defined UI components and can specify their own UI components. Since much of what then determines an application's visual appearance (look) and reaction to the user input (feel) is embedded in the logic of the broadcast application, it becomes very difficult for an entity residing on the receiver, such as an application manager, to influence the look and feel of an arbitrary application. What is desired is a mechanism that can allow a manufacturer to have some control over the look and feel of the user interface components of a digital television receiver, or similar electronic device, but yet is generic enough to be applied across many broadcast applications.

A second problem associated with the proposed environments 10 (FIG. 1) for digital television receivers is that applications using traditional windowing system concepts lack the dynamic graduation and dynamic multi-layered look that is generally associated with television graphics. What is needed, therefore, is a mechanism by which an application manager can enhance such applications with a more "TV friendly" look without interfering with the internal logic and programming of the broadcast applications.

SUMMARY OF THE INVENTION

Accordingly, the present invention provides a mechanism that can allow a manufacturer to have some control over the look and feel of the user interface components of a digital television receiver, or similar electronic device, that is generic enough to be applied across many broadcast applications. The present invention also provides a mechanism by which an application manager can enhance such applications with a more "TV friendly" look without interfering with their internal logic. More specifically, one embodiment of the present invention is directed to an extension to a procedurally-based UI specification that does not require modification of existing broadcast applications. The present invention is based on graphics compositing techniques. The present invention allows the insertion of "visual effects" into an existing broadcast application without the need to modify, recompile or reverse engineer the broadcast application.

A method and system are described for modifying the visual presentation and the response to user events of a user interface of a broadcast application program without altering the logic of the broadcast application program. In one embodiment, user interfaces are represented as a hierarchical scene including a background and several components. Within an electronic network, broadcast applications can become resident, e.g., land, on a vendor's device within the network where the device has the ability to display a user interface. The present invention provides a set of mattes that can be used to modify the look and feel of the user interface of a broadcast application without altering the broadcast application. In this way, the vendor of the device can have some level of control regarding the way in which user interfaces are displayed on the device and interact with the user.

Each matte controls the way in which an associated component of the user interface is displayed and how the component is combined with other components. In one embodiment, mattes can force components to become semi-transparent thereby creating certain fading effects, special effects with respect to windows in focus, special effects on windows becoming iconified, wiping effects, etc., with respect to the components of the user interface. The present invention can be implemented as a set of application programming interfaces (APIs) which can be used by an application manager of the vendor's device, e.g., a digital television receiver. The APIs would be available to broadcast applications and could be used for visual effects involving elements of an application's user interface.

More specifically, embodiments of the present invention are directed to a computer implemented method of displaying a graphical user interface comprising the steps of: a) receiving a broadcast application from an external digital source of information (e.g., in one application a. one-way channel with no back channel in conventional broadcasting), the broadcast application containing a hierarchy of graphical user interface components defining a first graphical user interface, the step a) performed by a digital television receiver coupled to a network and having host software; and b) displaying a second graphical user interface based on the first graphical user interface, the step b) comprising the steps of: by) the host software modifying both the visual presentation of the first graphical user interface and the reaction to user input of the first graphical user interface without altering any logic of the broadcast application by providing a respective matte for each component of the hierarchy, each matte controlling a portion of its component that is to be displayed and the manner in which its component is combined with other components; and b2) displaying the hierarchy, as modified by the step b1), on a display screen of the network. Embodiments include the above and wherein the display screen is a digital television and each matte controls whether or not its associated component is display semi-transparent to create fade-in, fade-out, wipe and highlighting effects.

DETAILED DESCRIPTION OF THE INVENTION

In the following detailed description of the present invention, a method and system for modifying the visual presentation of displays of a broadcast application program within an electronic audio visual network, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notational and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Electronic Network 50

Figure 1:
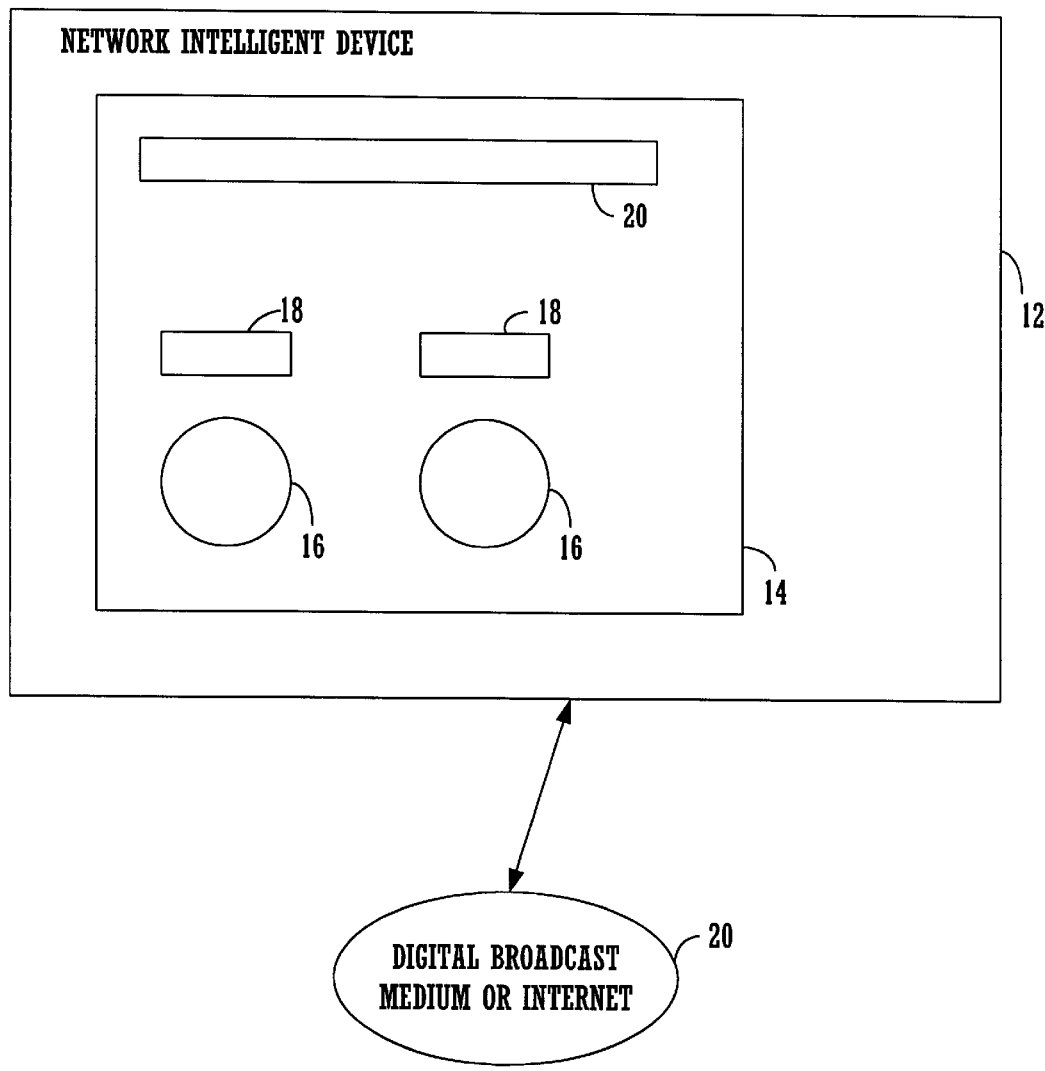
FIG. 1 illustrates a configuration of the prior art including a vendor device interfacing with a network that can receive information over the Internet or another digital broadcast medium.
Figure 2:
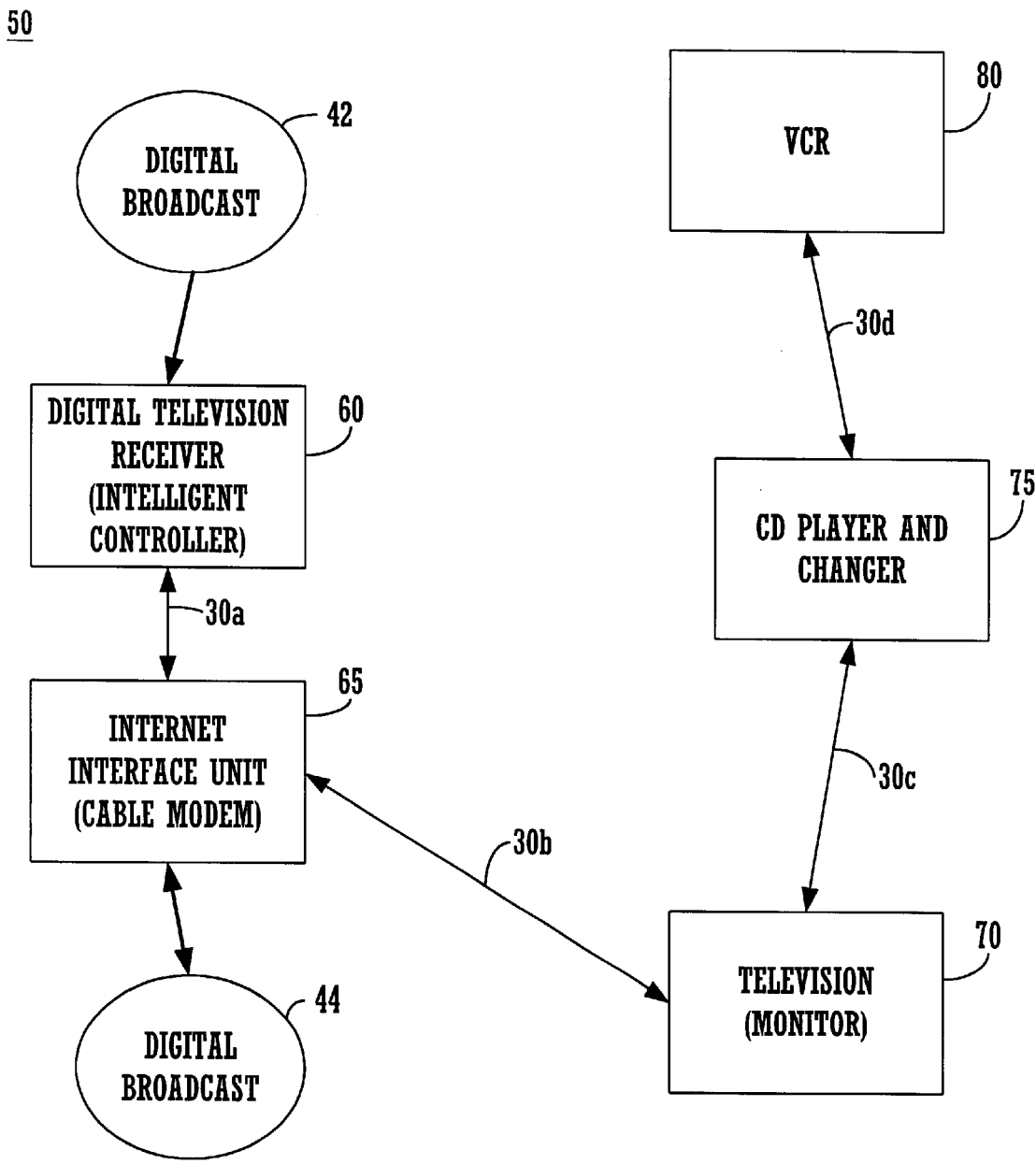
FIG. 2 is an audio/visual electronic network in accordance with one embodiment of the present invention including a vendor device and an interface to the Internet and a digital broadcast medium.

FIG. 2 illustrates an electronic communication network or system 50 in which one implementation of the present invention can be implemented. System 50 is exemplary and contains a number of electronic devices communicatively coupled together using communication links 30a–30d. Any number of different communication standards can be used in accordance with the present invention for links 30a–30d. However, in one embodiment, the communication links 30a–30d are serial communication links that are compliant with the IEEE 1394 serial communication standard. The system includes a digital television receiver unit 60 that is an intelligent device in that it contains an embedded computer system (see FIG. 3). The digital television receiver unit 60 contains host software and can be coupled, via the communication links, to an Internet interface unit 65 which is coupled to the Internet represented as 44 and is capable of accessing the world wide web there through. The Internet interface unit 65 is also coupled to a digital television monitor or display 70 which is coupled to a compact disk unit 75 which is coupled to a video cassette recorder (VCR) 80. These devices comprise an audio/video network. It is appreciated that intelligent device 60 can be any intelligent electronic device, such as a set-top-box, a computer system, a television unit, etc.

There are more than one source of external digital information available to the intelligent device 60. It is appreciated that digital television receiver unit 60 is also coupled, via communication links, to a source of digital broadcast information 42 which can be, for example, a digital cable source or a digital satellite source. The digital television receiver unit 60 can accept broadcast applications, e.g., software application programs that are downloaded from the digital broadcast source 42 (or the Internet 44) and become resident within the digital television receiver unit 60. It is appreciated that the term "broadcast application" also refers to any application program that is downloaded from the digital broadcast source 42 (or from the Internet 44) and becomes resident within the digital television receiver unit 60.

As discussed in more detail below, embodiments of the present invention provide a mechanism for allowing a manufacturer of an intelligent device 60, like the digital television receiver unit, to have some control over the look and feel of graphical user interfaces that are associated with broadcast applications that reside on the intelligent device. In one implementation, the intelligent device can control such display features as dynamic fade-in, dynamic fade-out, wiping, and highlighting, and other effects regarding window focusing, that are associated with the graphical user interface of the broadcast application, without altering the logic of the broadcast application.

Computer System 112

Figure 3:
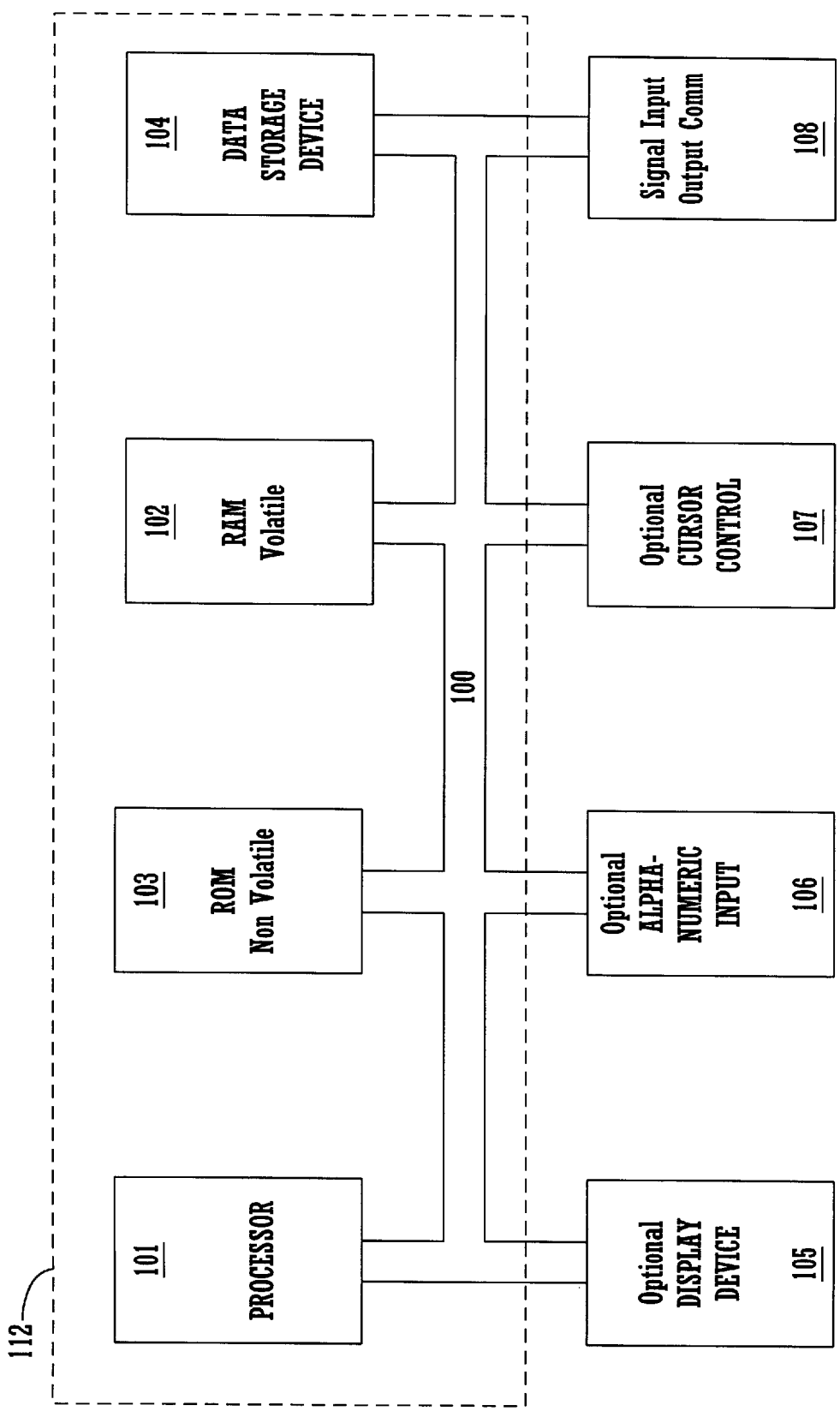
FIG. 3 is a block diagram of a generic vendor device (computer system) in accordance with an embodiment of the present invention.

Aspects of the present invention, described below, are discussed in terms of steps executed on a computer system (e.g., process 400 of FIG. 8). Although a variety of different computer systems can be used with the present invention, an exemplary general purpose computer system 112 is shown in FIG. 3. This computer system 112 can be embedded within an electronic device, such as the digital television receiver 60 of FIG. 2.

In general, computer system 112 of FIG. 3 includes an address/data bus 100 for communicating information, a central processor 101 coupled with the bus for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. Computer system 112 also includes a data storage device 104 ("disk subsystem") such as a magnetic or optical disk and disk drive coupled with the bus 100 for storing information and instructions and an optional display device 105 coupled to the bus 100 for displaying information to the computer user. The display device 105 can be an external digital television monitor 70 (FIG. 2).

Also included in computer system 112 of FIG. 3 is an alphanumeric input device 106 including alphanumeric and function keys coupled to the bus 100 for communicating information and command selections to the central processor 101. System 112 also includes a cursor control or directing device 107 coupled to the bus for communicating user input information and command selections to the central processor 101. Computer system 112 can also include an optional signal generating device 108 coupled to the bus 100 for interfacing with other networked computer systems or electronic devices. The display device 105 utilized with the computer system 112 of the present invention may be a liquid crystal device, other flat panel display, cathode ray tube, or other display device suitable for creating graphic images and alphanumeric characters recognizable to the user.

Hierarchical Graphical User Interfaces

Figure 4:
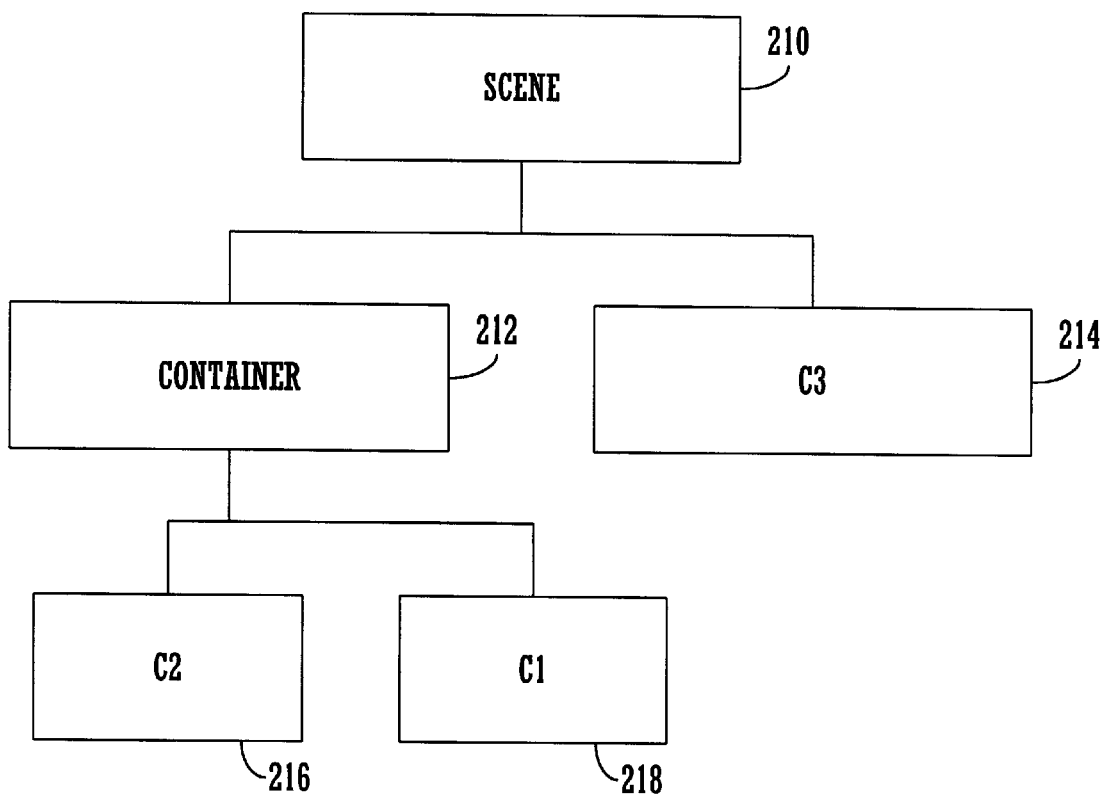
FIG. 4 is a diagram of a user interface represented by a scene hierarchy which includes a root scene having containers.

FIG. 4 illustrates an exemplary hierarchical graphical user interface (UI) 200 that can be contained within a downloaded broadcast application. The UI 200 can also be called a scene hierarchy. The UI 200 is constructed from a set of hierarchical components 210–218. Each component is associated with an element of the UI, for example, a button or a panel, and is rendered by software resident on the intelligent device 60. That is to say, host software resident on the intelligent device, in combination with the broadcast application, provides a procedural specification of the graphical operations needed to render the component. User interface components ("components") are arranged in a hierarchy. The root of the UI is called the scene 210 and it can contain "containers," for example, 212. The root can also contain graphical user interface elements. One software platform that utilizes the hierarchical definition of a user interface as shown in FIG. 4 is the Abstract Windowing Toolkit (AWT) used by the JAVA programming language and platform, e.g., java.awt.

Containers can hold other containers or graphical user interface elements, such as buttons, display fields, panels, menus, regions, etc., each that can define graphic information associated therewith. In the example of FIG. 4, container 212 holds elements C2 and C1 and the root 210 holds element C3. Within the scope of the present invention, the user interface definition that is contained within a broadcast application is called the first user interface. It is appreciated that elements that are situated lower in the scene hierarchy are generally rendered in front of elements that are situated higher in the scene hierarchy.

Figure 5:
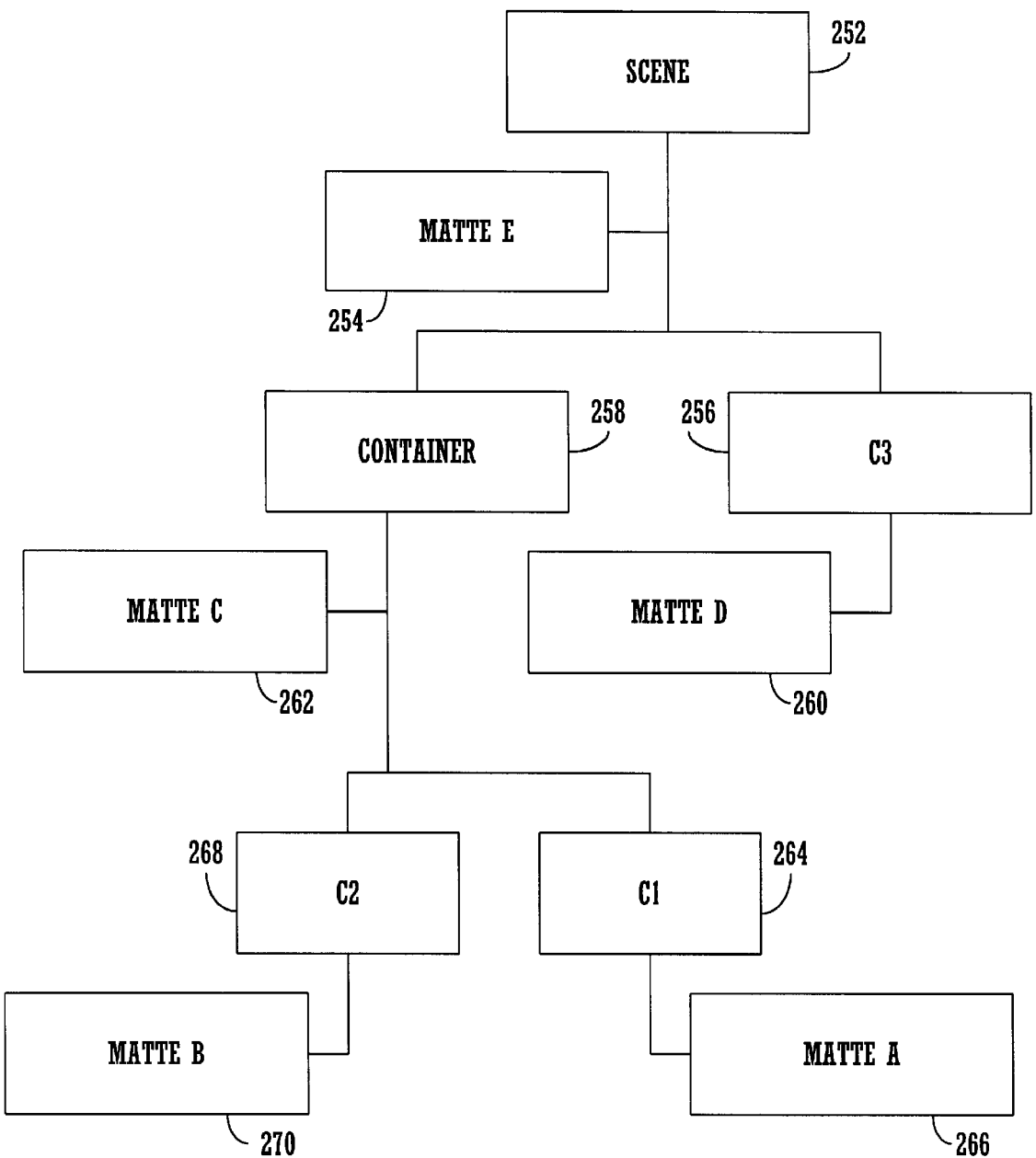
FIG. 5 is a diagram of a user interface in accordance with the present invention represented by a scene hierarchy which includes a root scene having containers and each component has a representative matte.

FIG. 5 illustrates a second user interface 250 or scene hierarchy constructed by the present invention, that is based on the first user interface 200 (FIG. 4), but contains a respective matte (also called key or mask) that is associated with each component of the user interface. The present invention inserts these mattes when the broadcast application instructs the host software of the intelligent device to render its graphical user interface. As shown, the root component or "scene" 252 has associated therewith a matte E 254. Container 258 has a matte C 262 associated therewith and elements c3 256 has matte D 260 associated therewith. Mattes 270 (matte B) and 266 (matte A) are respectively associated with elements c2 268 and c1 264. Each matte is the same size as its associated component and controls which portion or portions of the associated component is/are to be displayed and also which portions or portion of the associated component is/are to be combined with other components. In one implementation, mattes define portion or portions of their associated components that should be displayed as a solid image or as a semi-transparent image, or as a fully transparent image (e.g., not displayed at all).

It is appreciated that the addition of the mattes (mattes A–E) requires no modification to the broadcast application that constructed the scene hierarchy 200 (FIG. 4) of the first user interface. In other words, the addition of the mattes, and the modification of the user interface that is produced as a result of the mattes, is completely transparent to the broadcast application. For instance, the broadcast application can continue to operate while being completely unaware of the presence of the mattes which are added by the present invention.

As is discussed in more detail below, the mattes added by the present invention, allow the host software of the intelligent device 60 (and thereby the manufacturer of the intelligent device 60) to provide some level of control regarding the look and feel of any user interfaces that are generated by the intelligent device 60. This is provided, in accordance with the present invention, without modification to the logic of the broadcast application because the user interface generation is performed by Application Programming Interfaces (APIs) which reside in the host software of the intelligent device 60 but are external to the broadcast application.

Figure 6:
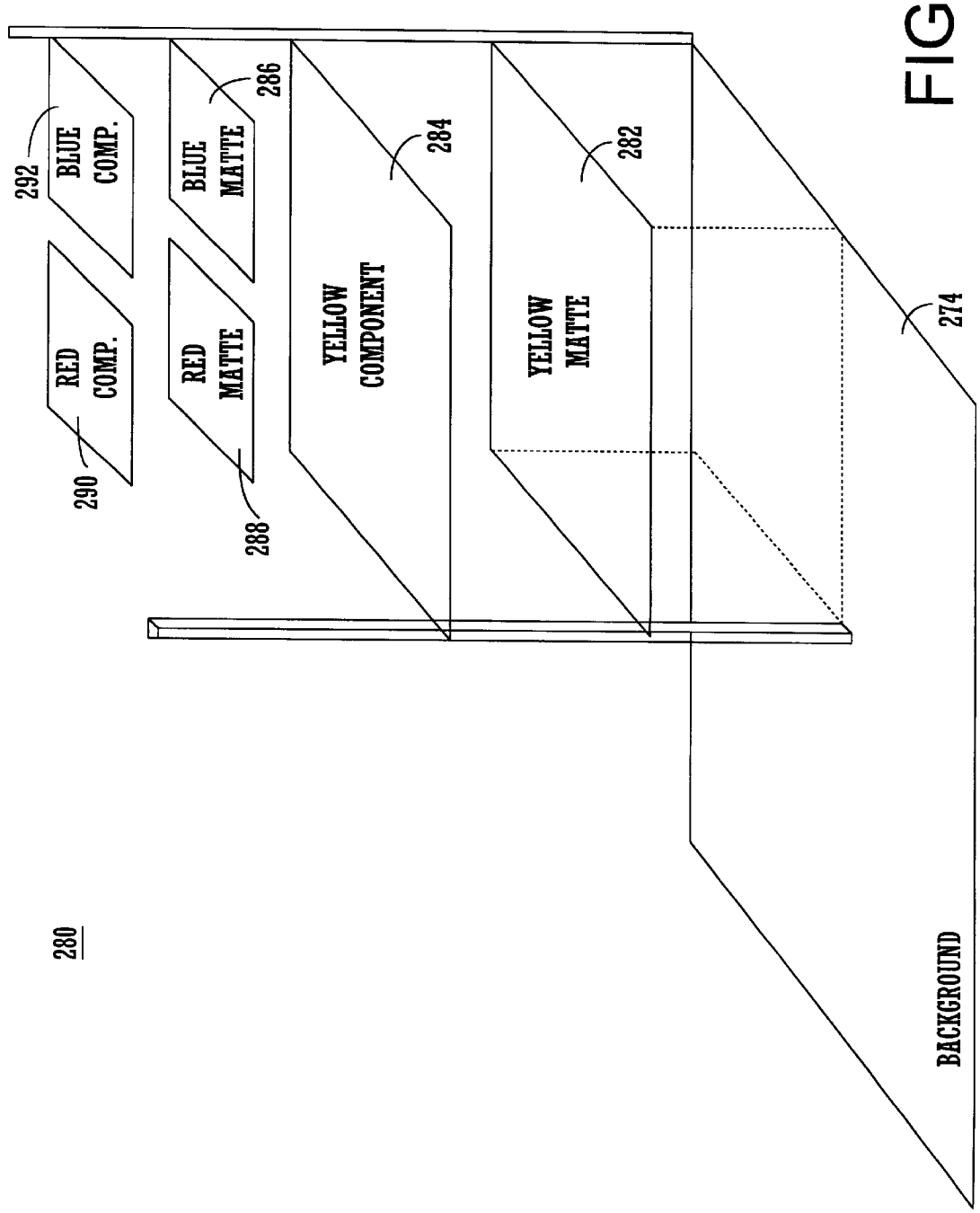
FIG. 6 is a 2½ D layering model of the scene hierarchy of FIG. 5 in accordance with one embodiment of the present invention including a background image and other component images with associated mattes.

FIG. 6 illustrates a 2½ D or layering model 280 which represents the scene hierarchy 250 generated by the present invention where the background image 274 is component c3 256. Front is the top and back is the bottom. The mattes influence the rendering of the scene and their operation can be visualized using the model 280. In model 280, a background image 274 exists and absent any instructions or definitions within the model 280 to display an alternate image, the background image 274 is always the default image to display. In model 280, container component 284 is called the yellow component or rectangle and it has an associated yellow matte 282. A red component or rectangle 290 and a blue component or rectangle 292 correspond to the c1 and c2 elements 264 and 268, respectively, of FIG. 5. The blue component 292 of FIG. 6 has an associated matte 286 and the red component 290 has an associated matte 288.

Figure 7:
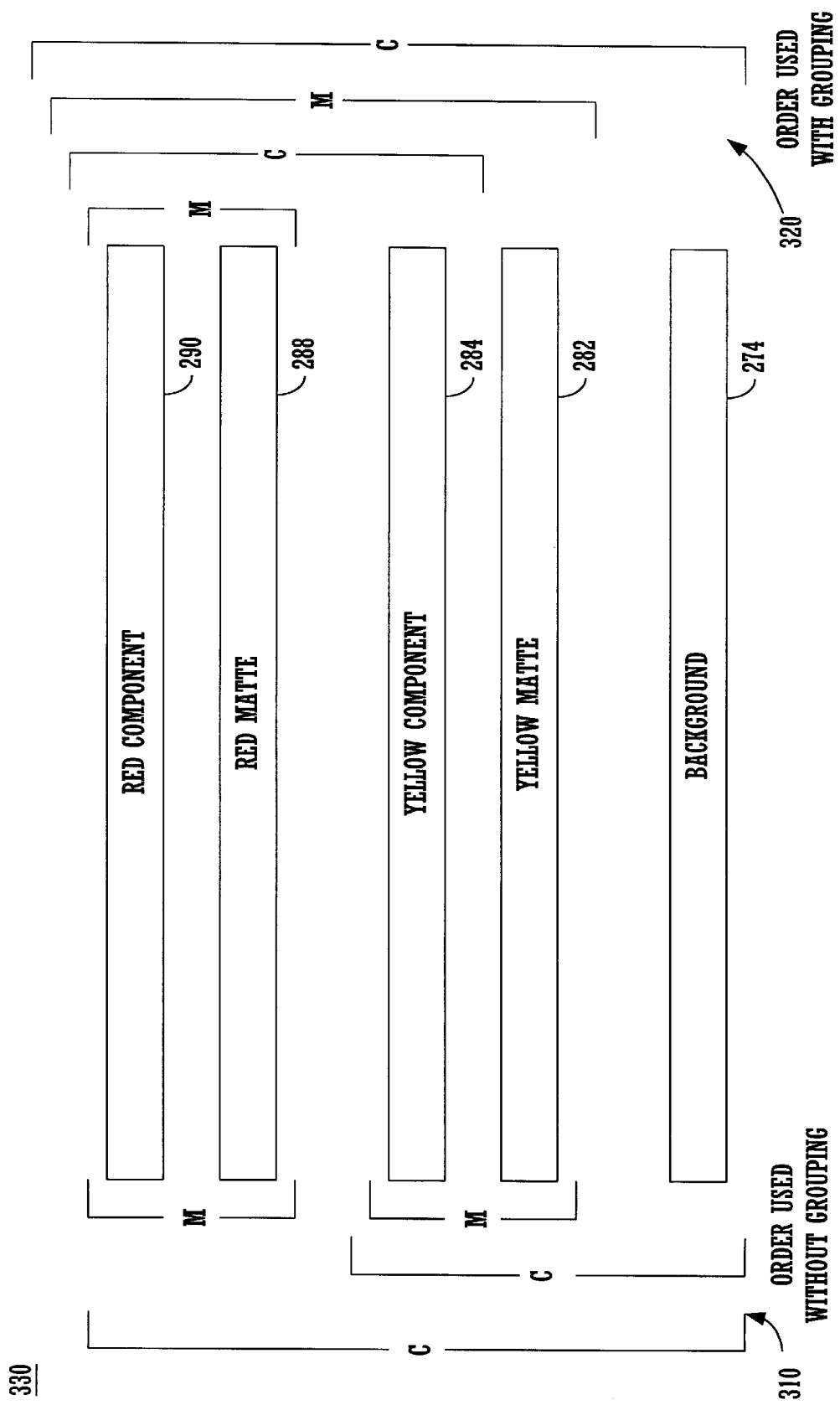
FIG. 7 illustrates rendering sequences for matted component grouping and when matted components are not grouped in accordance with the present invention.

FIG. 7 illustrates a configuration 330 of components of the scene hierarchy of FIG. 6 (without the blue component, for clarity) and is used to illustrate component grouping. Rendering a scene hierarchy with mattes consists of a sequence of matting, e.g., applying a matte to a component, and compositing operations, e.g., combining matted components together. These operations can be performed in various orders in accordance with the present invention and changing the order (e.g., via grouping) generally influences the visual appearance of the scene. The default order is to render each component, combine it with its matte, and then composite in the order back to front. However, it is very useful to be able to group a component with its parent so that the component is also combined with the matte of the parent. FIG. 7 illustrates a sequence of matting ("m") and compositing ("c") operations without grouping 310 (left) and with grouping 320 (right) of the top and middle components.

For instance, without grouping, the red component 290 and its matte 288 are matted together using a matte operation. Simultaneously, and separately, the yellow component 284 and its matte 282 are matted together in another matte operation. The result of the yellow matte operation is then combined with the background 274 using a compositing operation. The result of that compositing operation is then combined with the result of the red matte operation using a final compositing operation which produces the end result image.

With grouping, the images becomes clipped by the parent (e.g., lowest component or "base") of the group. In the example of FIG. 7, the red component 290 and its matte 288 are matted together in a matte operation. The result of the red matte operation is then combined with the yellow component 284. The result of this combine operation is then matted with the yellow matte 282 in a matte operation. The result of that matte operation is then combined with the background 274. FIGS. 9A–11C give various examples of the operation of the present invention with grouping and without grouping.

Figure 8:
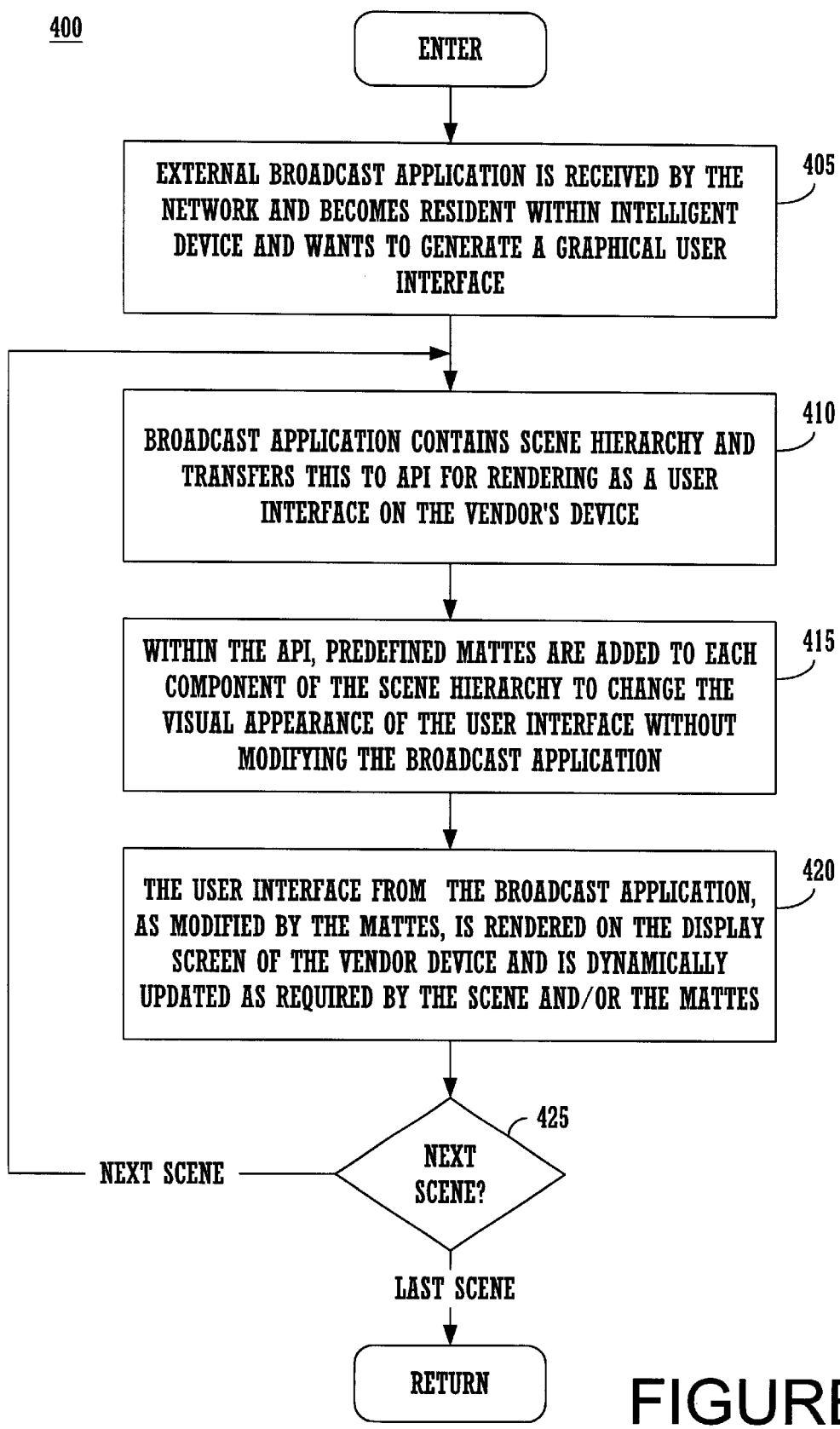
FIG. 8 is a flow diagram of steps of the process of the present invention for modifying the visual presentation of a user interface of a broadcast application without altering the broadcast application.

FIG. 8 is a flow diagram 400 illustrating steps performed by the present invention for modifying the look and feel of a graphical user interface of a broadcast application without altering the logic of the broadcast application. At step 405, the broadcast application is received by the network 50 from an external location, e.g., the Internet 44 or from a digital broadcast source 42. The broadcast application becomes resident within the intelligent device 60 and contains a scene hierarchy, e.g., in the format shown in FIG. 4. At step 410, the broadcast application transfers its scene hierarchy to an API which is part of the host software of the intelligent device 60 for generation of a user interface on a display screen (e.g., the digital television 70).

At step 415 of FIG. 8, the present invention adds predefined mattes to each component of the scene hierarchy to generate a new or modified scene hierarchy. This modified scene hierarchy is then displayed by the API at step 420, with or without grouping as defined by the broadcast application, on the display screen. In accordance with the present invention, the APIs of the host software are modified in such a way as the predetermined mattes are added to each UI component. Depending on the size, location and type of component or graphical user interface element, different predetermined mattes can be added to a particular component. The mattes alter the original scene hierarchy so that the look (visual appearance) and feel (reaction to user input) of the user interface is more consistent with a predetermined look and feel on which the predetermined mattes are based. Step 425 handles more scenes, if present.

Steps 415 and 420 modify the first scene hierarchy of the broadcast application in order to impart a level of control over the look and feel of the user interface displayed to the user by the intelligent device. This modification can be performed in order to provide a more uniform and consistent graphic display of information to the user, regardless of the broadcast application, or can be performed to make the resultant graphical user interface more TV friendly. Most computer graphical user interfaces and windowing themes do not have the appropriate levels of graduated images and the appropriate layering of images as is commonly seen in broadcast television pictures n the TV field. Therefore, to make the graphical user interfaces more TV friendly, mattes can be added to alter the image layering and image graduation quality of the user interface so that it offers a more TV-like appearance.

The present invention can alter more than just the appearance of boarders and ornamental objects of the user interface and can include altering the appearance of dynamic actions. For instance, the manner and look of windows that come in and out of focus can be altered by the present invention. For example, windows of the graphical user interface that are currently active can be made solid and the windows not active (e.g., not in focus) can be made semi-transparent.

Common techniques that can be employed to alter the first user interface include adding fading to the images by the use of transparency. For instance, by using a series of semi-transparent mattes for a particular user component, the component can be made to fade-in and fade-out dynamically as required. It can also fade left and fade right, creating a wiping characteristic. These display characteristics can be applied to buttons and panels so that a selected button can be highlighted and the rest can be made semi-transparent. Or, when a button is selected, the background can be wiped away leaving only the selected button. These are some examples of how transparency can be modified in response to user actions thereby enforcing a particular "feel" of the user interface.

The mattes used by the present invention can have various internal geometries, e.g., circular, square, rectangle, etc. Using a series of circular mattes of various diameters, a circular fade out or a circular fade in can be achieved for a particular component. Also, transparency can be used to alter the look of windows and programs when they become transformed into an icon, e.g., "iconified." In another example, the mattes can be used to enforce a particular display style with respect to images displayed in the window border, menus, selection bars, data entry fields, etc., all to maintain a particular visual presentation theme.

Figure 9A:
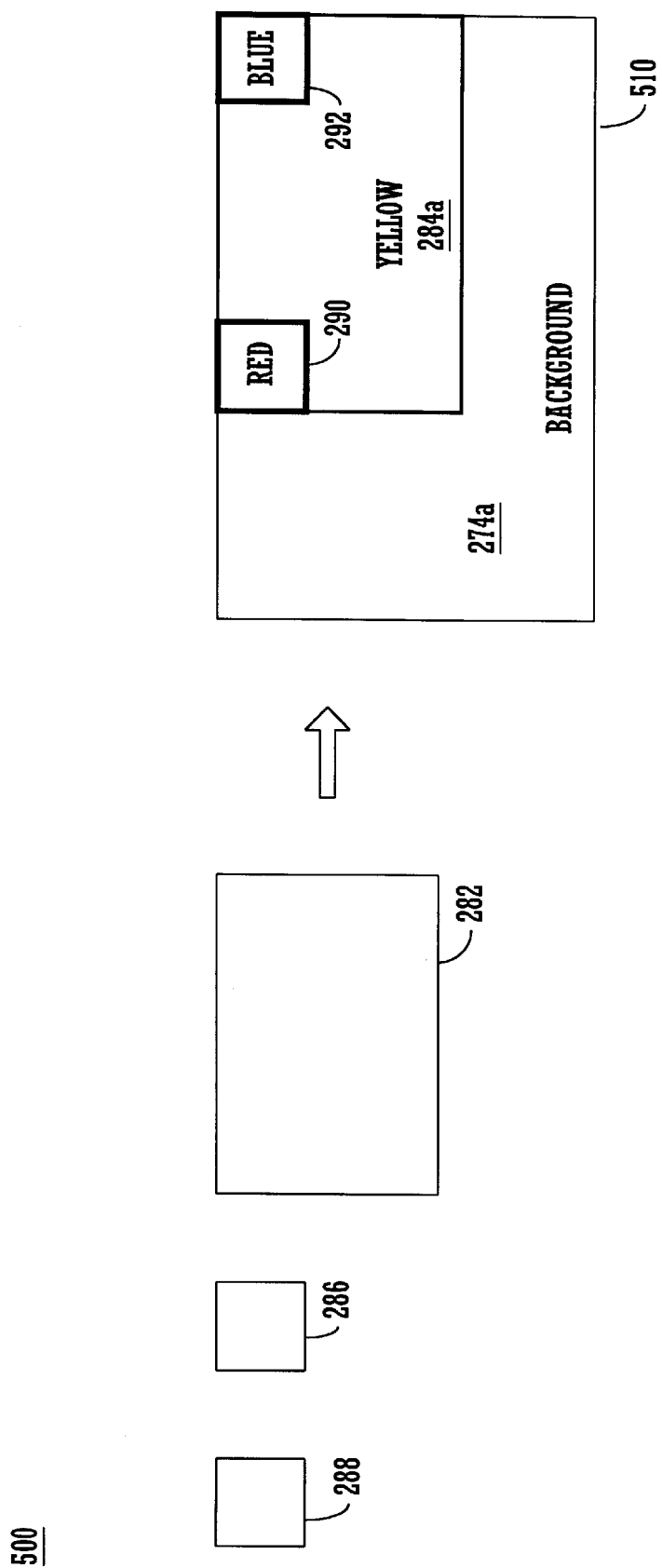
FIG. 9A is an example in accordance with one embodiment of the present invention for generating a scene having matted components when grouping is not performed.
Figure 9B:
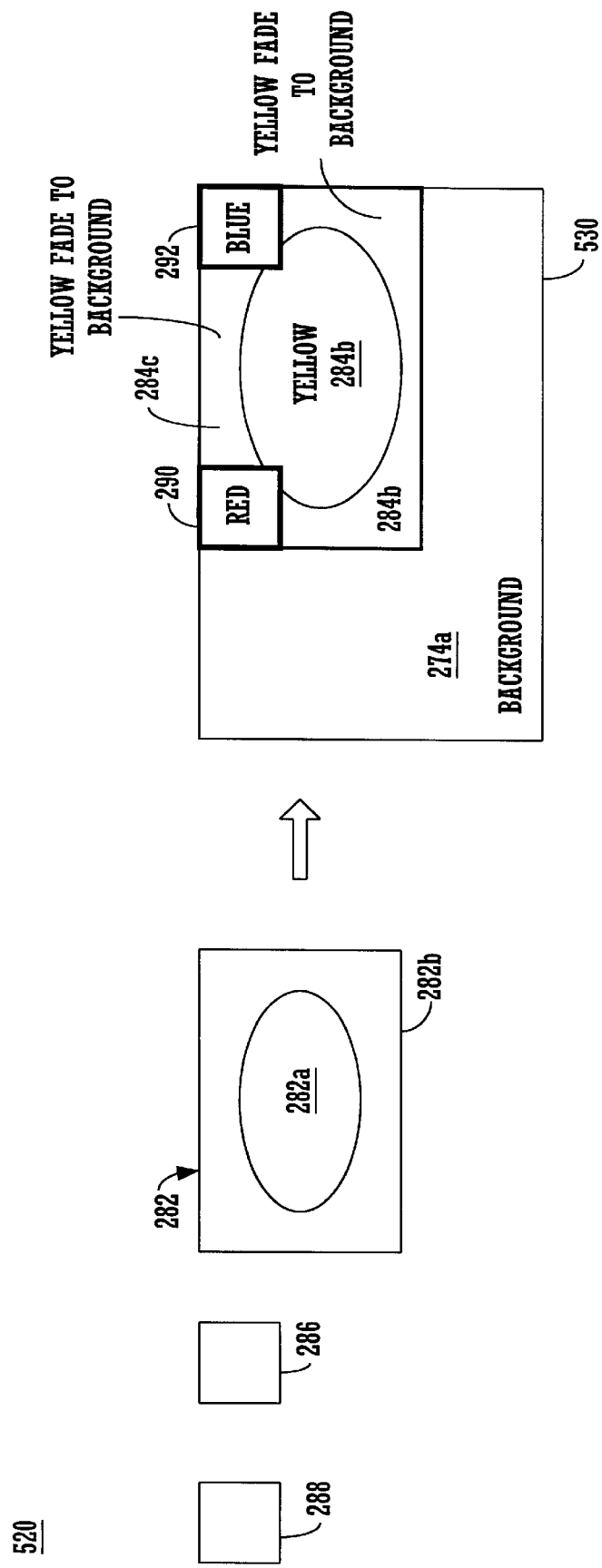
FIG. 9B is an example in accordance with one embodiment of the present invention for generating a scene having matted components when grouping is not performed and one matte includes a circular semi-transparent region.
Figure 9C:
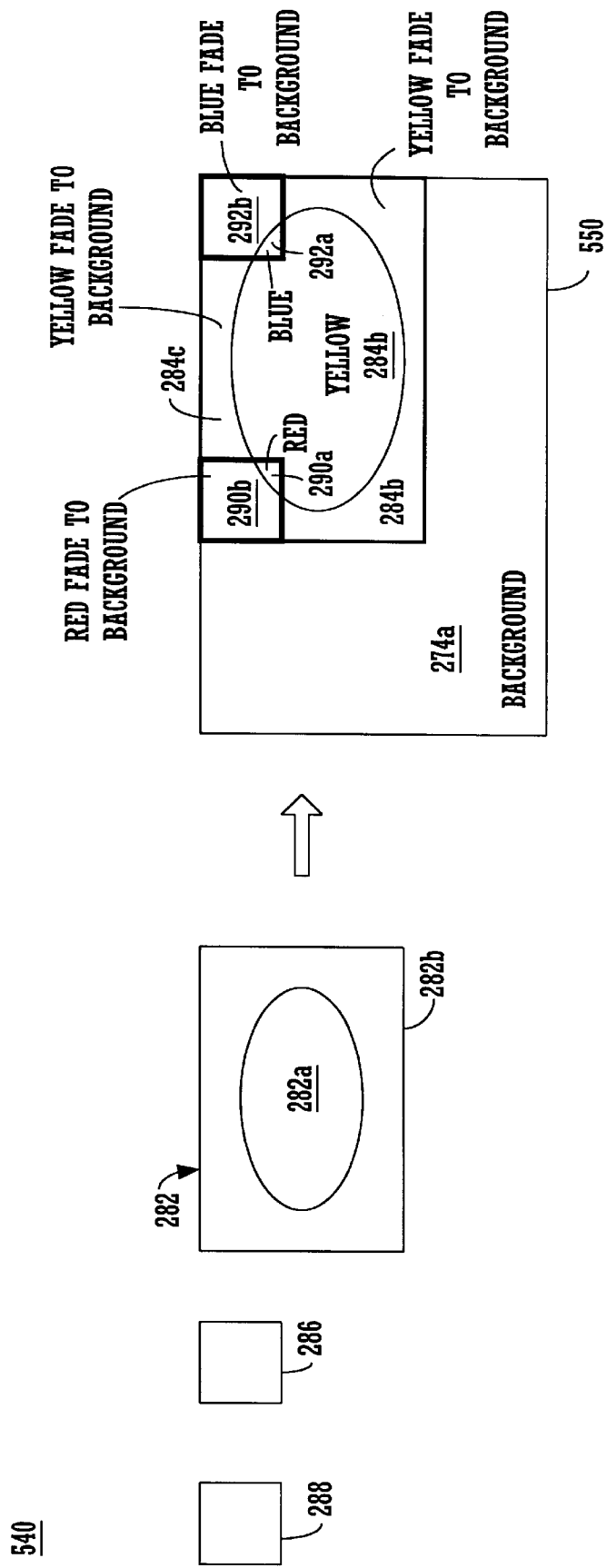
FIG. 9C is an example in accordance with one embodiment of the present invention for generating a scene having matted components when grouping is performed and one matte includes a circular semi-transparent region.

FIGS. 9A–9C illustrate examples of the use of mattes in a graphical user interface in accordance with the present invention. In FIG. 9A, a matte configuration 500 is shown for a user interface corresponding to the model of FIG. 6. The red matte 288 is clear representing a fully opaque (fully not transparent) matte. The same is true for the blue matte 286 and the yellow matte 282. This configuration is the same as not having mattes at all. The resulting image 510 includes an "L" shaped background 274a, an inverted "T" shaped yellow region 284a and two solid square regions 290 and 292 representing red and blue, respectively.

In FIG. 9B, a matte configuration 520 is shown having a yellow matte 282 that includes a fully opaque oval region 282a and a semi-transparent region 282b. Region 282b becomes more transparent as it reaches its rectangle's edges thereby creating a fade characteristic. Without any grouping in the rendering order, the resulting image 530 includes the "L" shaped background image 274a, a partially oval fully yellow region 284b and two solid square regions 290 and 292 representing red and blue, respectively. The image 530 also includes a region 284b and a region 284c that are each yellow but are semitransparent and allow a portion of the background to come through. The amount background allowed to come through increases closer to the rectangle edge thereby creating a fade-in of the background near the rectangle edges.

In FIG. 9C, a matte configuration 540 is shown which is the same as configuration 520 of FIG. 9B. However, the resulting image 550 is generated with grouping. With grouping in the rendering order, the resulting image 550 includes the "L" shaped background image 274a, a partially oval fully yellow region 284b and also includes a region 284b and a region 284c that are each yellow but are semitransparent and allow a portion of the background to come through. The amount background allowed to come through increases closer to the rectangle edge thereby creating a fade-in of the background near the rectangle edges. As a result of grouping, portions of each of the red and blue images are effected by the yellow matte 282. Portion 290b is red semi-transparent and fades to background toward the top and left edges. Corner portion 290a is solid red. Portion 292b is blue semi-transparent and fades to background toward the top and right edges. Corner portion 292a is solid blue.

Figure 10A:
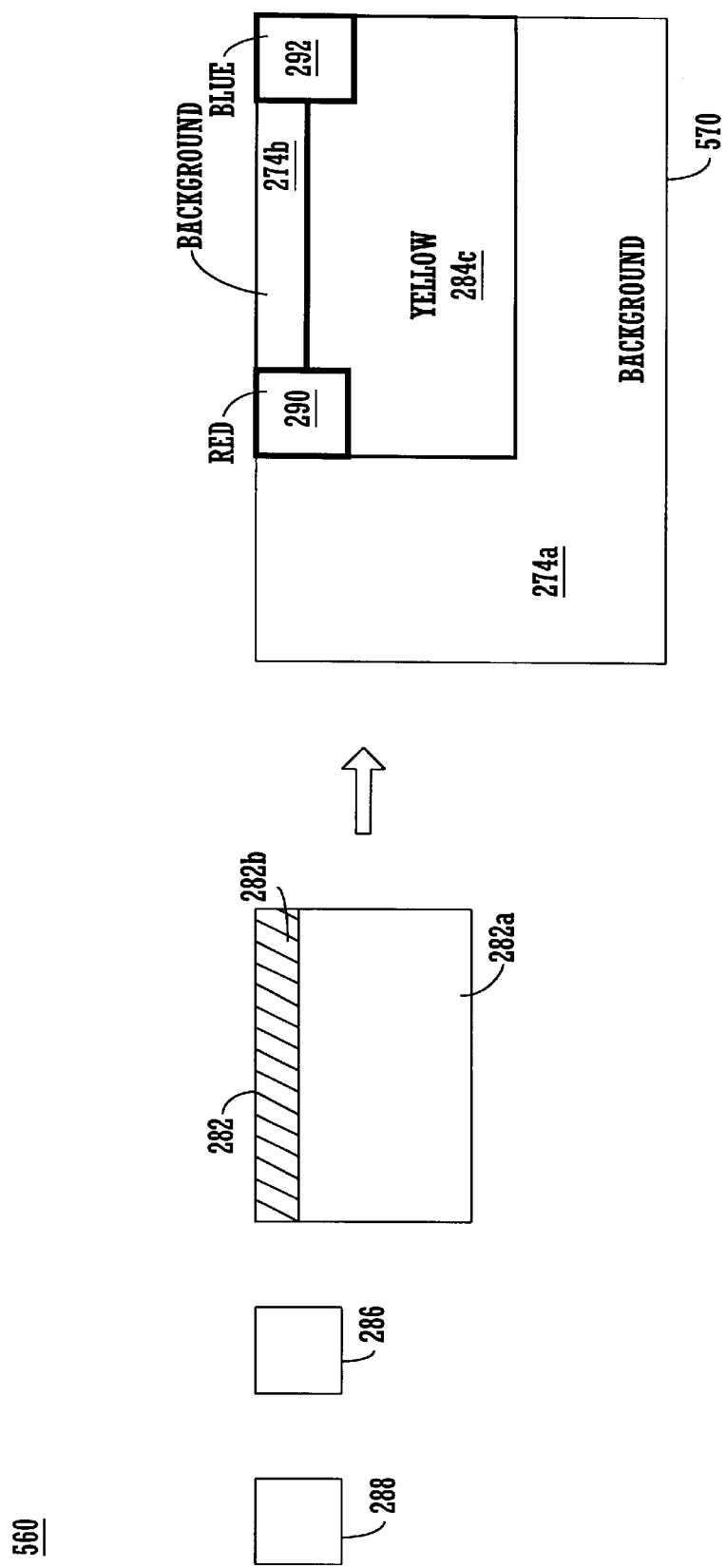
FIG. 10A is an example in accordance with one embodiment of the present invention for generating a scene having matted components when grouping is not performed and one matte includes a bar shaped fully transparent region.
Figure 10B:
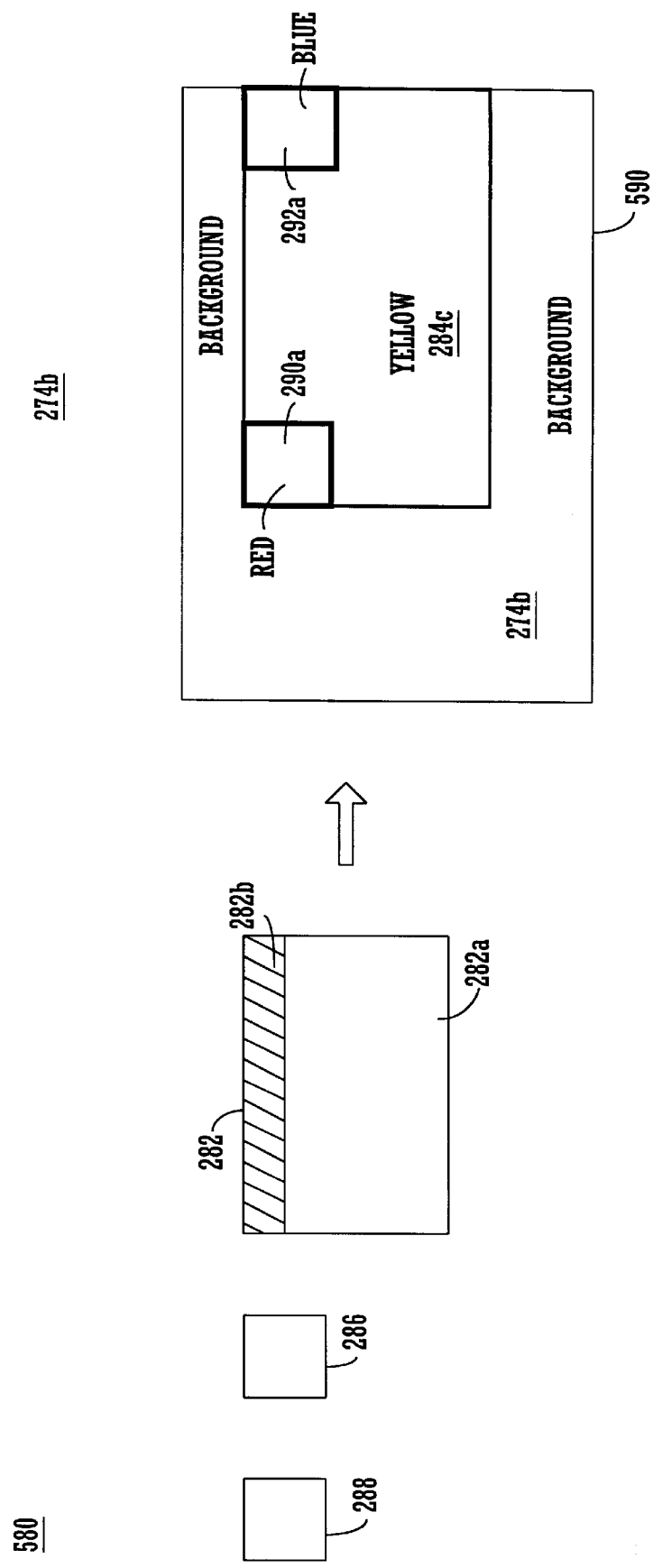
FIG. 10B is an example in accordance with one embodiment of the present invention for generating a scene having matted components when grouping is performed and one matte includes a bar shaped fully transparent region.

FIGS. 10A–10B illustrate further examples of the use of mattes in a graphical user interface in accordance with the present invention. In FIG. 10A, a matte configuration 560 is shown for a user interface corresponding to the model of FIG. 6. The red matte 288 is clear representing a fully opaque (fully not transparent) matte. The same is true for the blue matte 286 and the yellow matte 282 includes a fully transparent bar region 282b and a fully opaque region 282a. Without grouping, the resulting image 570 includes an "L" shaped background 274a, a rectangular shaped background region 274b, an inverted "T" shaped yellow region 284c and two solid square regions 290 and 292 representing red and blue, respectively.

In FIG. 10B, a matte configuration 580 is shown which is the same as configuration 560 of FIG. 10A. However, the resulting image 590 is generated with grouping. With grouping in the rendering order, the resulting image 590 includes a "C" shaped background image 274b, two clipped but solid rectangular regions 290a and 292a which are red and blue, respectively, and an inverted "T" shaped yellow region 284c. With grouping, the images are clipped based on the base of the group.

Figure 11A:
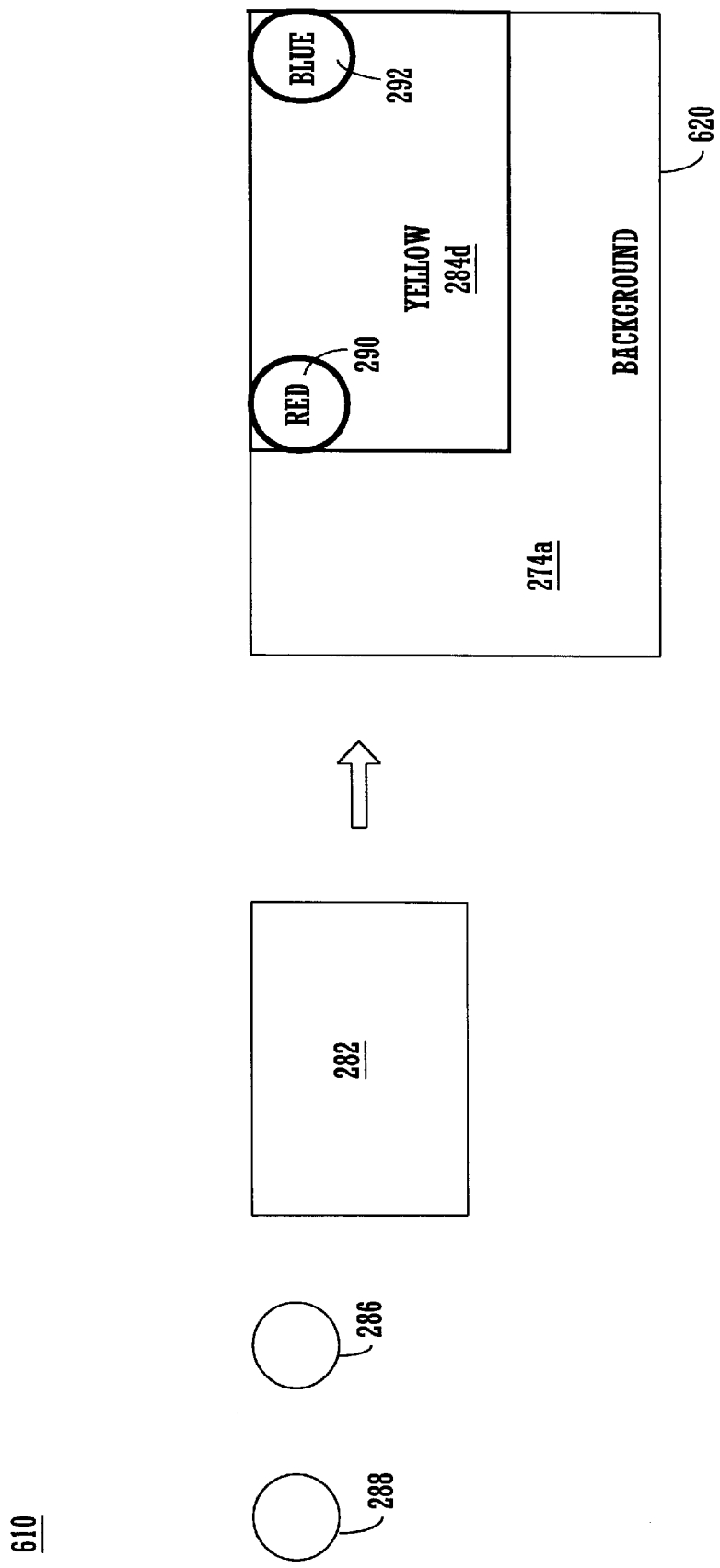
FIG. 11A is an example in accordance with one embodiment of the present invention for generating a scene having matted components when grouping is not performed and two components and their mattes are circular in shape.
Figure 11B:
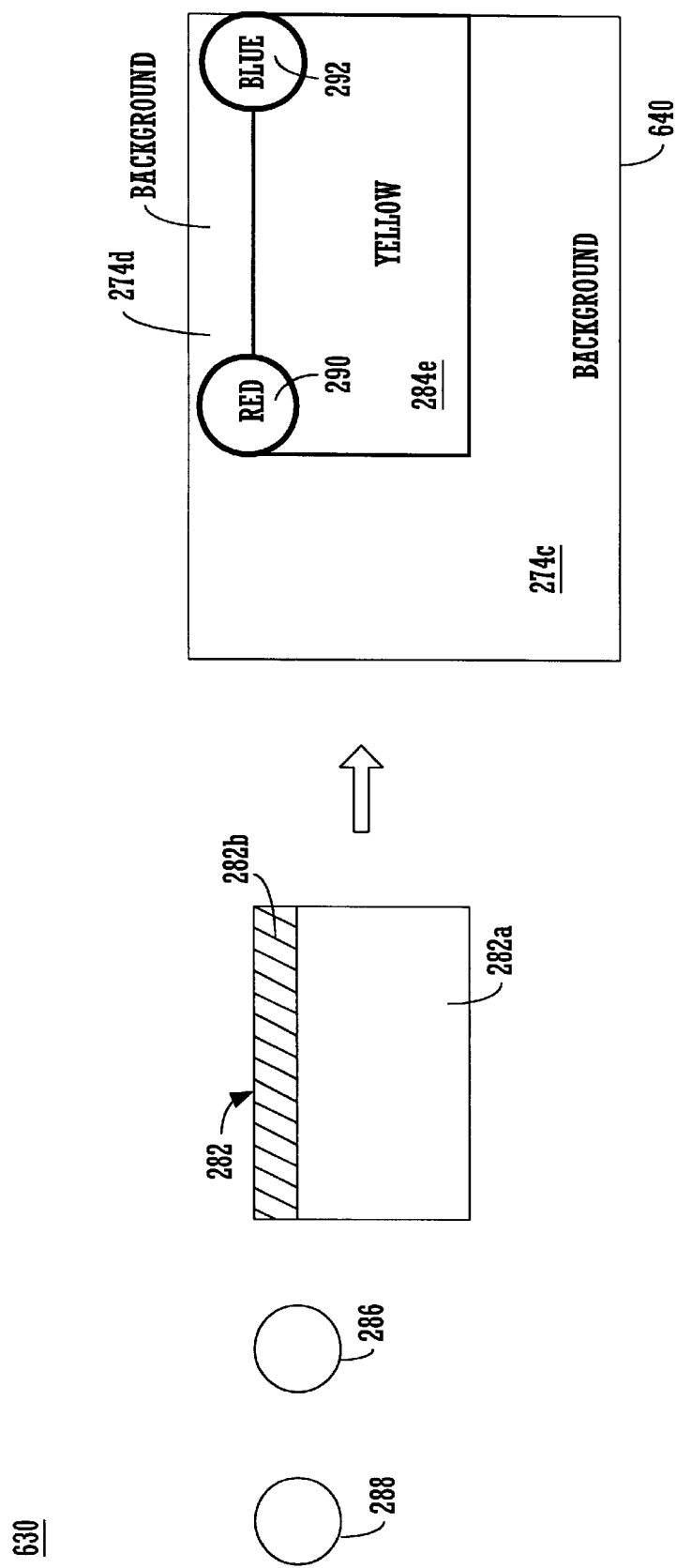
FIG. 11B is an example in accordance with one embodiment of the present invention for generating a scene having matted components when grouping is not performed and two components and their mattes are circular in shape and one matte contains a bar shaped fully transparent region.
Figure 11C:
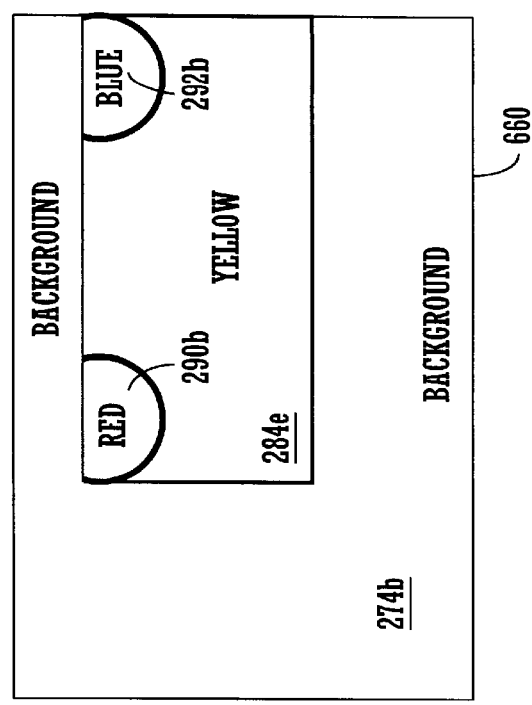
FIG. 11C is an example in accordance with one embodiment of the present invention for generating a scene having matted components when grouping is performed and two components and their mattes are circular in shape and one matte contains a bar shaped fully transparent region.
Figure 11C:
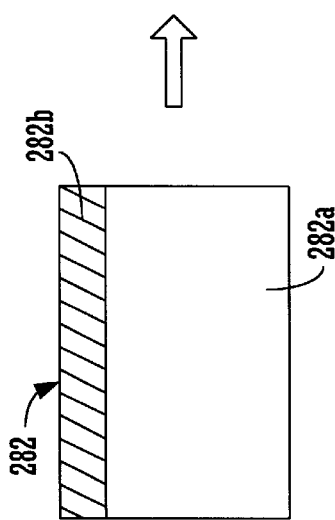
Figure 11C:
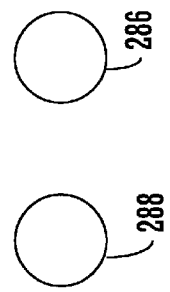

FIGS. 11A–11C illustrate further examples of the use of mattes in a graphical user interface in accordance with the present invention. In FIG. 11A, a matte configuration 610 is shown for a user interface similar to the model of FIG. 6. The red matte 288 is clear and circular representing a fully opaque (fully not transparent) matte. The same is true for the blue matte 286 and the yellow matte 282 (which is rectangular). Without grouping, the resulting image 620 includes an "L" shaped background 274a, a complex shaped yellow region 284d and two solid circular regions 290 and 292 representing red and blue, respectively.

In FIG. 11B, a matte configuration 630 is shown that is similar to configuration 610 but the yellow matte 282 contains a fully transparent bar region 282b and a fully opaque region 282a. Without grouping, the resulting image 640 includes a complex shaped background 274a with a small background portion 274d, a complex shaped yellow region 284e and two solid circular regions 290 and 292 representing red and blue, respectively.

In FIG. 11C, a matte configuration 650 is shown that is the same as configuration 630 but grouping is used in the resultant image 660. With grouping, the resulting image 660 includes a "C" shaped background 274b, a complex shaped yellow region 284e and two solid circular but clipped regions 290b and 292b representing red and blue, respectively. With grouping, the images are clipped based on the base of the group.

EXAMPLE SCENE COMPOSITING IMPLEMENTATION

The present invention can be implemented using a number of well known commercially available programming languages. For instance, the present invention can be implemented as extensions to the HAVi 1.0 standard "Home Audio Visual interoperabiity," (also, HAVi.UI level 2 JAVA interoperability) or as extensions to TV user interfaces proposed for ATSC and DVB. The following describes an example procedure for rendering and compositing a scene hierarchy, where a scene hierarchy is a hierarchy of components, each potentially with a matte.

Let:

RGB—a three channel buffer (r, g, b)

RGBA—a four channel buffer (r, g, b, a)

M—a single channel buffer (a)

c—a component

S—the Scene buffer (r, g, b)

The following operation is implemented by the broadcast application and represents the application's involvement in generating the user interface:

renderCompone nt (c)->RGBA

The following operation is determined by the matte associated with the component:

rendermatte (c)->M

The following operation combines the matte and the component, And define composite and matte operations as:

matte (RGBA, M)->RGBA' where:

r'=r, g'=g, b'=b, a'=a*m matte (RGB, M)->RGBA' where:

r'=r, g'=g, b'=b, a'=m composite $(RGB_b, RGBA_t)$->RGB' where (subscripts indicate top end bottom):

$r'=(1-a_t) r_b+(a_t) r_t;$ $g'=(1-a_t) g_b+(a_t) g_t;$ $b'=(1-a_t) b_b+(a_t) b_t;$

The following operation composites the scene and accounts for grouping, mattes components and renders the modified graphic user interface displayed to the user.

```
compositeScene ( ) {
        S < - (0, 0, 0 )
        for each unrendered component, c, in the scene
perform in back to front order {
        if (c is not grouped) {
                RGBA < - renderComponent (c)
                if component has a matte {
                        M < - renderMatte (c)
                        RGBA < - matte (RGBA, M)
                }
                S < - composite (S, RGBA)
        }
        else {
                RGB < - compositeGroup (c)
                if component has a matte {
                        M < - renderMatte (c)
                        RGBA < - matte (RGB, M)
                        S < - composite (S, RGBA)
                }
                else {
                        S < - composite (S, RGB1)
                }
        }
    }
}
```

The operation compositeGroup is similar to compositeScene except that it acts on a group hierarchy rather than a scene hierarchy. It is appreciated that because a component can only be grouped with its parent, a group hierarchy is typically a sub-tree of the scene hierarchy.

Although other definitions can be used, an example of a Matte API follows. Component mattes can be added to java.awt by extending java.awt. Component and introducing a Matte class. The following indicates the additional APIs.

```
import java.awt. * ;
public abstract class Hcomponent extends Component {
        public void SetMatte (Matte m) ;
        public Matte GetMatte ( ) ;
        public void GroupWithParent ( ) ;
        public void Ungroup ( ) ;
}
public class Matte {
        public final static int FlatMatte = 0x01;
        public final static int ImageMatte = 0x02;
        public final static int FlatEffectMatte = 0x03;
        public final static int ImageEffectMatte = 0x04;
        public int getMatteType ( ) ;
        / / constructors
        / /
        public Matte (float matte) ;
        public Matte (HImage matte) ;
        public Matte (float [ ] matte) ;
        public Matte (HImage [ ] matte) ;
        public float getFlatMatte ( ) ;
        public HImage getImageMatte ( ) ;
        public flat [ ] getFlatEffectMatte ( ) ;
        public Himage [ ] getImageEffectMatte ( ) ;
        public void startEffect (short speed, int repeat) ;
        public void stopEffect ( ) ;
}
```

The preferred embodiment of the present invention, a method and system for modifying the visual presentation of displays of a broadcast application program within an electronic audio visual network, is thus described. While the present invention has been described in particular embodiments, it should be appreciated that the present invention should not be construed as limited by such embodiments, but rather construed according to the below claims.

What is claimed is:

1. A computer implemented method of displaying a user interface comprising the steps of:

a) receiving a broadcast application containing a hierarchy of user interface components defining a first user interface, said step a) performed by an intelligent device coupled to a network and having host software; and b) displaying a second user interface based on said first user interface, said step b) comprising the steps of:

b1) said host software modifying both the visual presentation of said first user interface and the reaction to user input of said first user interface by applying a matte to a component of said hierarchy, said matte controlling a portion of said component that is to be displayed, said host software also controlling the manner in which a matted component is combined with other components of said hierarchy; and b2) displaying said second user interface comprising said first user interface as modified by said step b1) on a display screen.

2. A method as described in claim 1 wherein said host software modifies said visual presentation of the first user interface and said reaction to user input of said first user interface without altering any logic of said broadcast application.

3. A method as described in claim 1 wherein said step a) comprises the step of a1) receiving said broadcast application from an external digital source of information and wherein said external digital source of information is a digital broadcast medium and wherein said intelligent device is a digital television receiver.

4. A method as described in claim 1 wherein said host software includes application programming interfaces (APIs) for rendering user interfaces on said display screen.

5. A method as described in claim 1 wherein each matte of step b1) controls a portion of its component to be displayed semi-transparent.

6. A method as described in claim 1 wherein each matte of step b1) allows its component to be displayed with fade effect, wipe effect and highlighting effect.

7. A method as described in claim 1 wherein said network is a network of audio/video electronic devices coupled using a serial communication interface.

8. A computer implemented method of displaying a graphical user interface comprising the steps of:
   a) receiving a broadcast application from an external digital source of information, said broadcast application containing a hierarchy of graphical user interface components defining a first graphical user interface, said step a) performed by a digital television receiver coupled to a network and having host software; and
   b) displaying a second graphical user interface based on said first graphical user interface, said step b) comprising the steps of:
      b1) said host software modifying both the visual presentation of said first graphical user interface and the reaction to user input of said first graphical user interface by applying, a matte to a component of said hierarchy, said matte controlling a portion of said component that is to be displayed, said host software also controlling the manner in which a matted component is combined with other components of said hierarchy; and
      b2) displaying said second graphical user interface comprising said first graphical user interface as modified by said step b1) on a display screen of said network.

9. A method as described in claim 8 wherein said host software modifies said visual presentation of said first graphical user interface and said reaction to user input of said first graphical user interface without altering any logic of said broadcast application.

10. A method as described in claim 9 wherein said external digital source of information is a digital broadcast medium and wherein said display screen is a digital television.

11. A method as described in claim 9 wherein said host software includes application programming interfaces (APIs) for rendering graphical user interfaces on said display screen.

12. A method as described in claim 9 wherein each matte of step b1) controls a portion of its component to be displayed semi-transparent.

13. A method as described in claim 9 wherein each matte of step b1) allows its component to be displayed with fade effect, wipe effect and highlighting effect.

14. A method as described in claim 9 wherein said network is a network of audio/video electronic devices coupled using a serial communication interface.

15. A network of electronic devices comprising:
   intelligent device means for receiving a broadcast application containing a hierarchy of user interface components defining a first user interface, said intelligent device means having host software means;
   said host software means for modifying both the visual presentation of said first user interface and the reaction to user input of said first user interface, without altering any logic of said broadcast application, by applying a respective matte to each component of said hierarchy, each matte controlling a portion of its component that is to be displayed, said host software means also controlling the manner in which its component is combined with other components of said hierarchy; and
   display means coupled to said intelligent device for displaying a second user interface comprising said first user interface as modified by said host software means.

16. A network as described in claim 15 wherein said intelligent device means is a digital television receiver.

17. A network as described in claim 15 wherein said intelligent device means receives said broadcast application from an external digital source of information.

18. A network as described in claim 15 wherein said host software means includes application programming interfaces (APIs) for rendering user interfaces on said display means.

19. A network as described in claim 15 wherein each matte controls a portion of its component to be displayed semi-transparent.

20. A network as described in claim 15 wherein each matte allows its component to be displayed with fade effect, wipe effect and highlighting effect.

* * * * *